US010896696B2

(12) United States Patent
Asmussen et al.

(10) Patent No.: US 10,896,696 B2
(45) Date of Patent: *Jan. 19, 2021

(54) TAPE DRIVE SYSTEM WITH TAPE SURFACE INSPECTION UNIT

(71) Applicant: International Business Machines Corporation, Armonk, NY (US)

(72) Inventors: Ole Asmussen, Henstedt-Ulzburg (DE); Robert Beiderbeck, Wassenberg (DE); Erik Rueger, Ockenheim (DE); Markus Schafer, Heiligenmoschel (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,531

(22) Filed: Oct. 16, 2019

(65) Prior Publication Data

US 2020/0051593 A1     Feb. 13, 2020

Related U.S. Application Data

(63) Continuation of application No. 16/131,440, filed on Sep. 14, 2018, now Pat. No. 10,622,016, which is a (Continued)

(51) Int. Cl.
*G11B 5/09*  (2006.01)
*G11B 20/18* (2006.01)
(Continued)

(52) U.S. Cl.
CPC ...... *G11B 20/1816* (2013.01); *G11B 5/00813* (2013.01); *G11B 5/00821* (2013.01); *G11B 5/40* (2013.01); *G11B 2020/1826* (2013.01)

(58) Field of Classification Search
None
See application file for complete search history.

(56) References Cited

U.S. PATENT DOCUMENTS 4,455,634 A * 6/1984 Efron .................... G06F 11/277
369/53.41
4,679,744 A * 7/1987 Chikamasa ............ G11B 15/66
242/534
(Continued)

FOREIGN PATENT DOCUMENTS

| JP | 2005063500 | 3/2005 |
| JP | 2007240290 | 3/2006 |
| JP | 2010230684 | 5/2010 |

OTHER PUBLICATIONS

Office Action (dated Jan. 30, 2018) for U.S. Appl. No. 15/704,187, filed Sep. 14, 2017.
(Continued)

*Primary Examiner* — Peter Vincent Agustin
(74) *Attorney, Agent, or Firm* — Schmeiser, Olsen & Watts, LLP; Nicholas L. Cadmus (57) ABSTRACT

A tape drive system for ensuring tape data integrity by tape surface inspection, the tape drive system being configured for reading and writing data from/to a magnetic tape, is provided. The tape drive system includes a laser inspection unit comprising a sender and a receiver integrated into the tape drive system, wherein the laser inspection unit configured for recognizing a tape defect by scanning the magnetic tape when the tape drive system is in operation. The tape drive system includes a read/write head configured for acting together with the laser inspection unit as sensors for providing sensor data during a read/write operation of the tape drive system, a communication link between the sensors and a controller unit for exchanging sensor data. The controller is configured for evaluating sensor data and for
(Continued)

triggering predefined actions based on the respective evaluation results such that the tape data integrity is ensured.

18 Claims, 6 Drawing Sheets

Related U.S. Application Data continuation of application No. 15/704,187, filed on Sep. 14, 2017, now Pat. No. 10,109,313.

(51) Int. Cl.
*G11B 5/008* (2006.01)
*G11B 5/40* (2006.01)

(56) References Cited

U.S. PATENT DOCUMENTS

| | | | | |
|---|---|---|---|---|
| 4,887,171 A * | 12/1989 | Rose | ............ | G11B 27/36 360/31 |
| 5,450,247 A * | 9/1995 | Schwab | ............ | G11B 5/865 360/16 |
| 5,963,389 A * | 10/1999 | Wojciechowski | ... | G11B 5/5927 360/70 |
| 6,018,434 A * | 1/2000 | Saliba | ............ | G11B 5/584 360/77.13 |
| 7,146,034 B2 | 12/2006 | Reeves et al. | | |
| 7,418,635 B2 * | 8/2008 | Schulstad | ............ | G06F 11/0727 714/42 |
| 10,109,313 B1 * | 10/2018 | Asmussen | ............ | G11B 20/1816 |
| 10,622,016 B2 * | 4/2020 | Asmussen | ............ | G11B 5/00821 |
| 2019/0080716 A1 * | 3/2019 | Asmussen | ............ | G11B 5/00813 |
| 2020/0051593 A1 * | 2/2020 | Asmussen | ............ | G11B 5/00813 |

OTHER PUBLICATIONS

Amendement (dated Apr. 30, 2018) for U.S. Appl. No. 15/704,187, filed Sep. 14, 2017.

Notice of Allowance (dated Jun. 13, 2018) for U.S. Appl. No. 15/704,187, filed Sep. 14, 2017.

Office Action (dated May 1, 2019) for U.S. Appl. No. 16/131,440, filed Sep. 14, 2018.

Amendment (dated Aug. 1, 2019) for U.S. Appl. No. 16/131,440, filed Sep. 14, 2018.

Notice of Allowance (dated Aug. 19, 2019) for U.S. Appl. No. 16/131,440, filed Sep. 14, 2018.

* cited by examiner

TAPE DRIVE SYSTEM WITH TAPE SURFACE INSPECTION UNIT

This application is a continuation application claiming priority to Ser. No. 16/131,440, filed Sep. 14, 2018, now U.S. Pat. No. 10,622,016, issued Apr. 14, 2020, which is a continuation of Ser. No. 15/704,187, filed Sep. 14, 2017, U.S. Pat. No. 10,109,313, issued Oct. 23, 2018.

TECHNICAL FIELD

The invention relates generally to a tape drive system and a tape library system, and more specifically, to a tape drive system for ensuring tape data integrity by tape inspection of a magnetic tape. The invention relates further to a method for ensuring tape data integrity by tape inspection of a magnetic tape, and a related method for operating a tape library system, and a computer program product.

BACKGROUND

As data becomes the new fuel of complete industries, storing this vast amount of data in a reliable form becomes instrumental for enterprises of any scale.

SUMMARY

Aspects of a tape drive system, method, and computer program product is provided. An aspect relates to a tape drive system for ensuring tape data integrity by tape surface inspection. The tape drive system is configured for reading and writing data from or to a magnetic tape, and includes a laser inspection unit. The laser inspection unit includes a sender and a receiver integrated into the tape drive system, and is configured for recognizing a tape defect by scanning the magnetic tape when the tape drive system is in operation. A read/write head is further configured for acting together with the laser inspection unit as sensors for providing sensor data during a read/write operation of the tape drive system. A communication link between the sensors and a controller unit allows the exchanging of the sensor data, wherein the controller is configured for evaluating the sensor data and for triggering predefined actions based on the respective evaluation results such that the tape data integrity is ensured.

DETAILED DESCRIPTION

There are storage requirements defined by extreme short access times as well as storage requirements that except comparably longer read and write times but which are able to store vast amounts of data at low price points. Although parts of industries are moving to archives on hard drives or SSD (solid state disk) there continues to be a demand for storing data in a reliable manner on magnetic tapes. Significant industry trends affect the way storage strategies have advanced. Some of the industry trends include a growing motivation to migrate data to cloud storage, the concept of storage virtualization, the requirement for data deduplication and automatic storage tiring. Vendors are often driven by the long-term responsibility to make sure that the customer data will be accessible at any time without any impact.

However, the longer the lifetime of magnetic tape cartridges is, the more problems arise from tape cartridges that may be contaminated with any kind of debris, scratches on the tape for any reasons or folds on edges of the magnetic tape. In the past, techniques have been developed to detect tape errors and clean tape cartridges in dedicated systems, which may often lead to unavailability of data on the cartridges that failed to deliver the data on the cartridge's medium. At the same time, in particular, with huge installations with thousands of tape cartridges, it is quite impossible to find the "bad guy" tape cartridges. There may also be another major issue of cross-contamination meaning that a polluted tape may leave the tape's dirt on the read/write head of the tape drive and the next mounted tape may pick up the dirt. Finally, more or less, all tape drives and tape cartridges within the tape library may be affected after some time.

According to a first aspect of the present invention, a tape drive system for ensuring tape data integrity by tape surface inspection may be provided. The tape drive system may be adapted for reading and writing data from/to a magnetic tape. The tape drive system may comprise a laser inspection unit comprising a sender and a receiver integrated into the tape drive system. The laser inspection unit may be adapted for recognizing a tape defect by scanning the magnetic tape when the tape drive system is in operation.

The tape drive system may also comprise a read/write head adapted for acting together with the laser inspection unit as sensors for providing sensor data during a read/write operation of the tape drive system, and a communication link between the sensors and a controller unit for exchanging sensor data. The controller may be adapted for evaluating the sensor data and for triggering predefined actions based on the respective evaluation results such that the tape data integrity may be ensured.

According to another aspect of the present invention, a tape library system comprising a plurality of tape drives and at least one tape drive system for ensuring tape data integrity by tape surface inspection having all the features of the tape drive system according to the first aspect may be provided.

According to a further aspect of the present invention, a method for ensuring tape data integrity by tape surface inspection when using the tape drive system which is adapted for reading and writing data from/to a magnetic tape is provided. The method may comprise providing a laser inspection unit comprising a sender and a receiver integrated into the tape drive system, recognizing, by the laser inspection unit, a tape defect by scanning the magnetic tape when the tape drive system is in operation. A read/write head may act together with the laser inspection unit as sensors for providing sensor data during a read/write operation of the tape drive system. The method may further comprise exchanging sensor data between the sensors and the a controller unit, evaluating, by the controller, sensor data, and triggering, based on the evaluation, predefined actions based on the respective evaluation results such that the tape data integrity is ensured.

According to another aspect of the present invention, a method for operating a tape library system may be provided. The tape library system may comprise a plurality of tape drives and at least one tape drive system for ensuring tape data integrity by tape surface inspection according to the first aspect as described above. The method may comprise, upon detecting an operational error of one of the plurality of tape drives, using a current magnetic tape, loading the current magnetic tape into one of the at least one tape drive systems, scanning the magnetic tape during operation of the tape drive system with the laser inspection unit, and detecting a magnetic tape defect when the tape drive system is in operation.

It may be noted that a difference may be made between a (normal) tape drive and the modified tape drive according to the first aspect; such a modified tape drive may be denoted as tape drive system.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

In the context of this description, the following conventions, terms and/or expressions may be used:

The term 'tape drive' may denote a data storage device that reads and writes data on a magnetic tape. Magnetic tape data storage may typically be used for offline, archival data storage. A tape media generally has a favorable unit cost and a long archival stability. A tape drive may provide sequential access storage. A tape drive must physically wind the tape between the reels to read any one particular piece of data. However, tape drives may stream data very quickly off a tape when the required position has been reached. For example, as of 2016, Linear Tape-Open (LTO) supported continuous data transfer rates of up to 300 MB/s, comparable to hard disk drives.

The term 'tape drive system' may denote a regular tape drive for reading and/or writing data in digital form on a magnetic tape. Additionally included is the laser inspection unit.

The term 'magnetic tape' may denote a medium for magnetic recording, made of a thin, magnetizable coating on a long, narrow strip of plastic film.

The term 'tape defects' may denote any irregularity, in or on the magnetic tape, in form of a fold, an edge in the tape a scratch or debris, dust, oil or any other material apart from the magnetic layer.

The term 'laser inspection unit' may denote an electronic-mechanical device comprising a laser light source sending out light pulses and measuring a time span between the sending the light pulses and receiving them back in reflected form from (e.g., the surface of the magnetic tape). If any tape defects are present, the travel time will be different if compared to a clean tape. The laser inspection unit may be positioned in a small distance to the surface of the magnetic tape.

The term 'bad spot' or also 'bad spot on tape' may denote an area of a magnetic tape with non-homogeneous magnetization. The non-homogenous magnetization areas on a tape may not be used to write any data on the tape.

The term 'tape library system' may denote a plurality of tape drives typically installed physically in one rack for reading and writing a plurality of magnetic tapes in parallel. Such tape drive systems may also be sometimes called a tape silo, tape robot or tape jukebox, and may describe a storage device which comprises one or more tape drives, a number of slots to hold tape cartridges, a barcode reader to identify tape cartridges and an automated method for loading tapes (e.g. a robot).

The term 'tape drive dump' may denote saving all actual data of a tape drive to another storage location on another storage device. All actual data may comprise all buffered data, position data, the logical and physical position of the tape, all tape management, and status and error code information. Basically, the complete status of the tape drive in form of any available data may be saved.

The proposed tape drive system for reading and writing data from/to a magnetic tape and for detecting tape defects may offer multiple advantages and technical effects. The integration of a laser inspection unit into a tape drive, which is operated under normal conditions, in order to scan the tape material during the read/write process, represents a major step forward when compared to state-of-the-art technologies. Traditional technologies may have separated units for an inspection of magnetic tapes and/or magnetic tape cartridges, while traditional tape drives for real/write operations (i.e., data access) are used on the other side). The proposed method and system may allow for an integrated process of inspecting a tape under normal operational conditions (i.e., standard read/write operations).

Thus, the magnetic tapes may be monitored continuously during standard operations such that abnormal characteristics of the magnetic tape may be inspected and/or verified immediately during the normal operation of the tape drive system. In addition, finding such a bad spot on a magnetic tape may be reported immediately, so that precautions may be made in order not to contaminate other magnetic tapes, cartridges and/or tape drives. In a nutshell, such an improvement may save a lot of drive and magnetic tape cartridge replacements which represents the norm in today's data centers. The risk of harming the data on the tape may be reduced significantly because of the visibility of potential risks or the tape.

The ability to have the laser inspection unit as well as the read/write head operating as sensors, may allow for a more sophisticated reaction schema in case of an error or a detection of a tape defect. Depending on the combined results of the sensors, different actions may be taken as detailed below (e.g. table 1).

The usage of a laser inspection unit may advantageously be used instead of a camera system because the size of the laser inspection unit may typically be smaller than a camera system, so that the laser inspection unit may be easier to integrate into a tape drive.

Additionally, it may be more difficult to illuminate the surface of the magnetic tape in order to recognize the type of tape defect. Furthermore, the laser inspection unit may need a simpler controller instead of sophisticated image recognition for the tape defect.

However, in one embodiment, it may also be possible to use a camera system instead of the laser inspection unit, which may have the advantage that the type of tape defect may be treated differently. For example, a scratch may cause that the tape may be replaced immediately and no cleaning may be required. However, if the magnetic tape may carry debris, then a cleaning may be required in order not to contaminate other tapes as well.

In the following, more embodiments of the tape drive system and the tape library system are disclosed. The principles of the systems may also be applicable to the related methods.

According to one advantageous embodiment of the tape drive system, the laser inspection unit may be positioned adjacent to a read/write head of the tape drive system, which may also include having the laser inspection unit positioned on the same side of the magnetic tape as the read/write head of the tape drive. However, the laser inspection unit may be positioned with a distance to the magnetic tape for a proper function. Hence, a correlation between the tape position relative to the head and a tape defect identified by the laser inspection unit may elegantly be determined.

According to another advantageous embodiment of the tape drive system, the laser inspection unit generates time difference information between a point in time of sending a laser pulse from a laser light source of the laser inspection unit and receiving back the laser pulse reflected be the magnetic tape positioned in the tape drive system. Thus, tape defects, scratches and/or debris, dust or dirt on the tape may easily be detectable.

According to an exemplary embodiment, the tape drive system may also comprise a controller adapted for relating the tape defect to an error condition of which at least one is selected out of the group comprising a permanent write error, a permanent read error, and a tape bad spot correction threshold exceedance. Thus, the normally detected operational errors of a tape in a tape drive system may be put into a location relationship with a tape defect identified by the laser inspection unit.

According to one possible embodiment of the tape drive system, the tape defect may at least be one selected out of the group: a tape contamination (e.g. debris), a scratch on the magnetic tape or, a fold or bend edges of the magnetic tape. Thus, typical tape defects may be detected easily.

According to an additionally exemplary embodiment of the tape library system, the laser inspection unit may be positioned adjacent to a read/write head of the tape drive system.

According to one advantageous embodiment, the method may also comprise, upon detecting a magnetic tape defect, winding the magnetic tape to a detected tape defect location and repeating scanning the magnetic tape with the laser inspection unit using a reduced winding speed of the magnetic tape compared to a winding speed of an initial detection of the tape defect under a normal operation mode (i.e., read and/or write operation mode). The magnetic tape defect may be one of a permanent read error or a permanent write error. However, also other defects may trigger the same reduced speed inspection: a permanent servo error, a forced cleaning because of a bad performance of the tape read/write process, a servo track following error, and/or a C1/C2 error correction threshold may have been reached or exceeded. The C1/C2 error classification may be related to a standard error code of external media like CDs, tape cartridge drive, DAT drive etc.

According to an optional embodiment, the method may also comprise, upon also detecting a tape defect under the reduced winding speed, performing a tape drive dump (i.e., save the status of the tape) as well as data read and written to another storage device (e.g. disk drive) for securing the data and for a further inspection.

According to another optional embodiment, the method may also comprise generating a signal indicative of a need for manual inspection to a remote console (i.e., "call-home"). Service personnel may be alarmed automatically in order to define the appropriate action, such as replacing defect tape drive systems, cleaning a tape drive, replacing a tape cartridge or whatever measure is determined to reset a tape drive, a tape cartridge or a tape library to a normal operation mode and/or to prevent further damage. It may be noted that some aspects of the action may be performed automatically by the drive itself.

According to one additionally permissive embodiment, the method may also comprise, upon detecting a tape drive contamination, performing a loading of a cleaning tape into the tape drive system, and performing a cleaning of the tape drive using the cleaning tape. Through this automated cleaning of the part(s) in question, an automated maintenance procedure may be triggered, which may reduce the requirement for service personnel. The tape drive library may care for itself and avoid further malfunctions.

In the following, a detailed description of the figures will be given. All instructions in the figures are schematic. Firstly, a block diagram of an embodiment of the inventive tape drive system for reading and writing data from/to a magnetic tape and for detecting tape defects and a tape library system is given. Afterwards, further embodiments, as well as embodiments of the method for detecting defects on a magnetic tape in a tape drive system, and the method for operating a tape library system, will be described.

Figure 1:
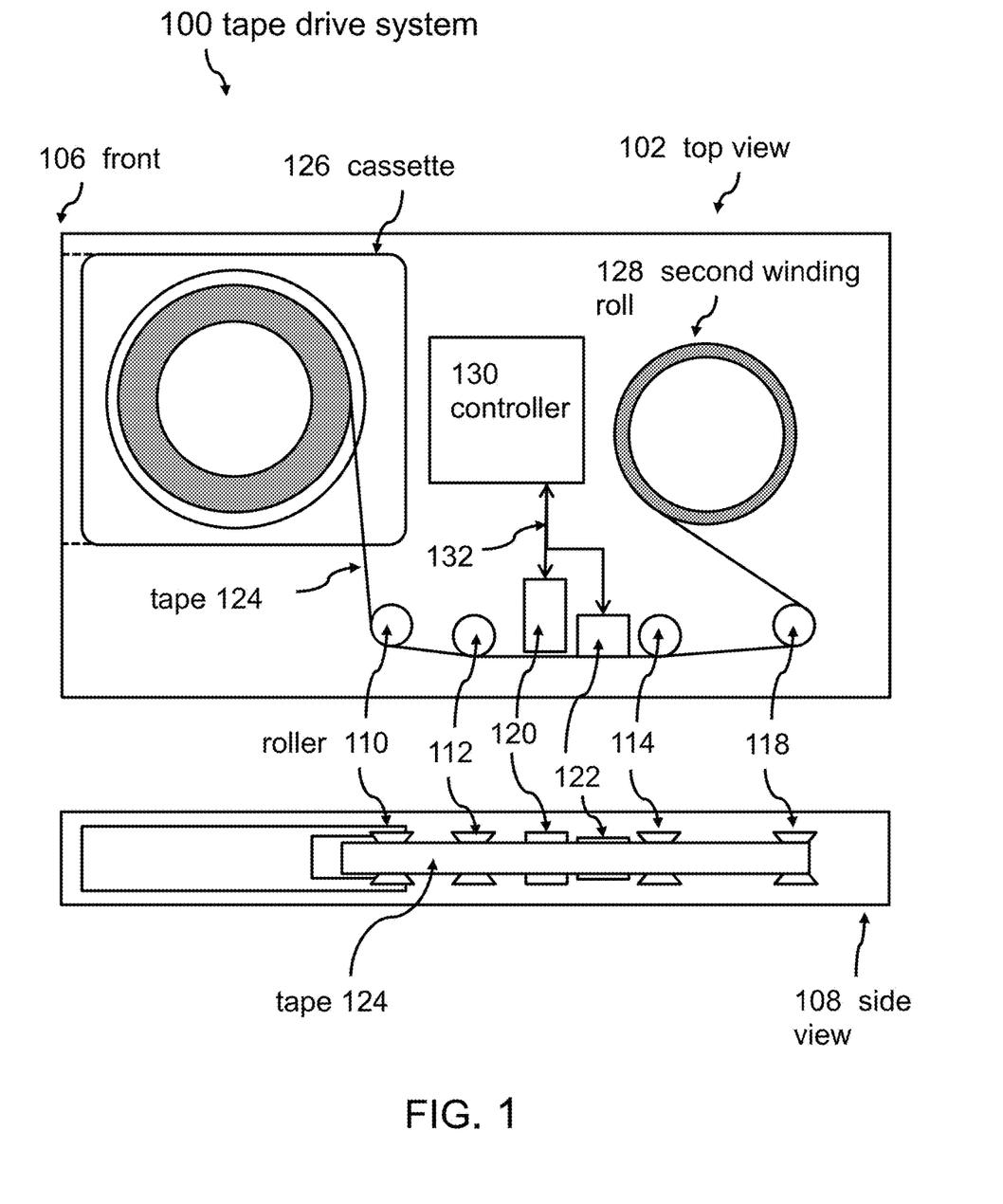
FIG. 1 shows a block diagram of a tape drive system for ensuring tape data integrity by tape surface inspection, in accordance with embodiments of the present invention.

FIG. 1 shows a block diagram of a tape drive system 100 for ensuring tape data integrity by tape surface inspection, in accordance with embodiments of the present invention. The tape drive system 100 is operable for reading and writing data from/to a magnetic tape 124 and for detecting tape defects. The upper part of FIG. 1 shows a top view 102 onto the tape drive system 100, whereas the lower part of FIG. 1 shows a corresponding side view 108 of the tape drive system 100.

The magnetic tape 124 is unwound or rewound from or to the cassette 126 along the rollers 110, 112, 114, 118 to the second winding roll 128. The cassette may be loaded into the tape drive system 100 from the front side 106. The tape surface may pass along the read/write head 122. Additionally, the magnetic tape 124 may pass along the laser inspection unit 120, which may be positioned adjacent to the read/write head 122. However, the laser inspection unit 120 may also be positioned at other places along the path of the magnetic tape 124.

Figure 4:
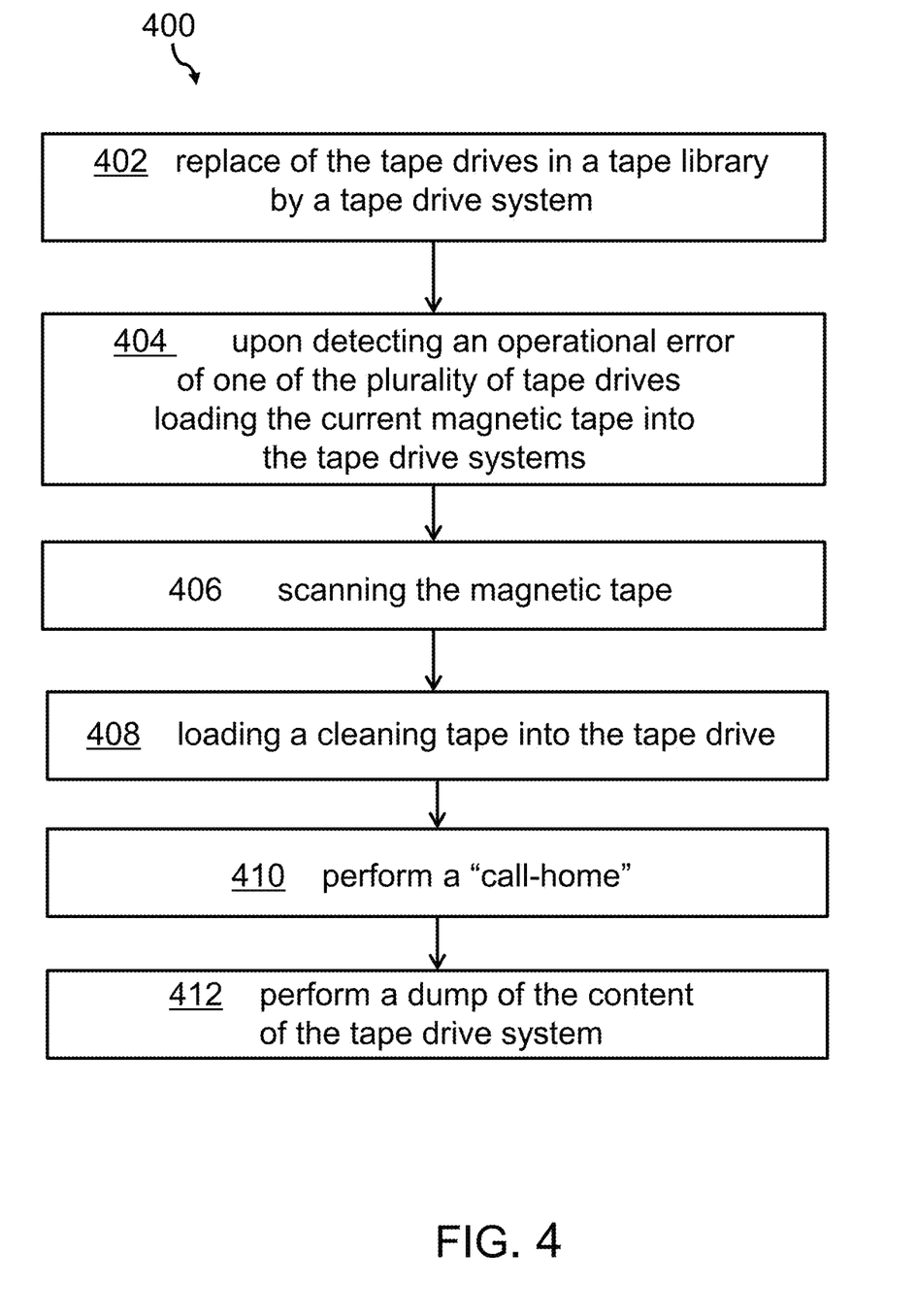
FIG. 4 shows a block diagram of a method for operating a tape library system, in accordance with embodiments of the present invention.

The read/write head 122 as well as the laser inspection unit 120 are each connected to a communication link 132 which links to read/write head 122 as well as the laser inspection unit 120 to controller 130 which acts upon the incoming signals, interpreted as sensor data, in order to apply different reaction templates as detailed in the context of FIG. 4, in particular table 1.

Figure 2:
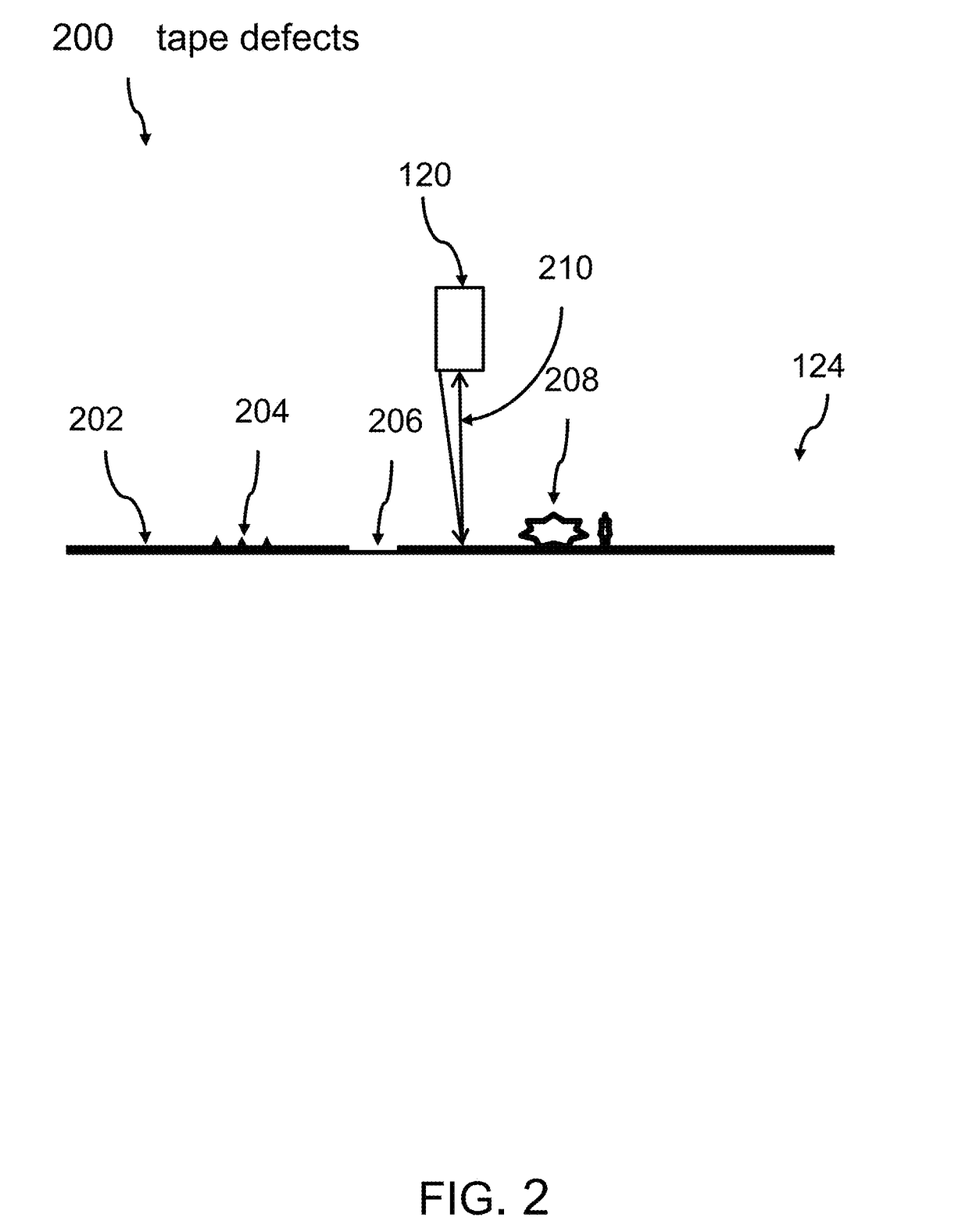
FIG. 2 shows a diagram of tape defects of different kind on the surface of the magnetic tape facing the read/write head, in accordance with embodiments of the present invention.

FIG. 2 shows a diagram of tape defects 200 of different kinds of dirt on the surface 202 of the magnetic tape facing the read/write head (not shown), in accordance with embodiments of the present invention. From left to right, a fold 204 of the magnetic tape 124 as well as a scratch 206 and debris 208 are shown. However, in any case, the travel time equivalent to the distance 210 of light from the light source to the potentially damaged surface of the magnetic tape is different to the travel time of light if the surface 202 of the magnetic tape would have no defects. In any case, the laser inspection unit 120 is enabled to measure such time difference and indicate a tape defect this way.

Figure 3:
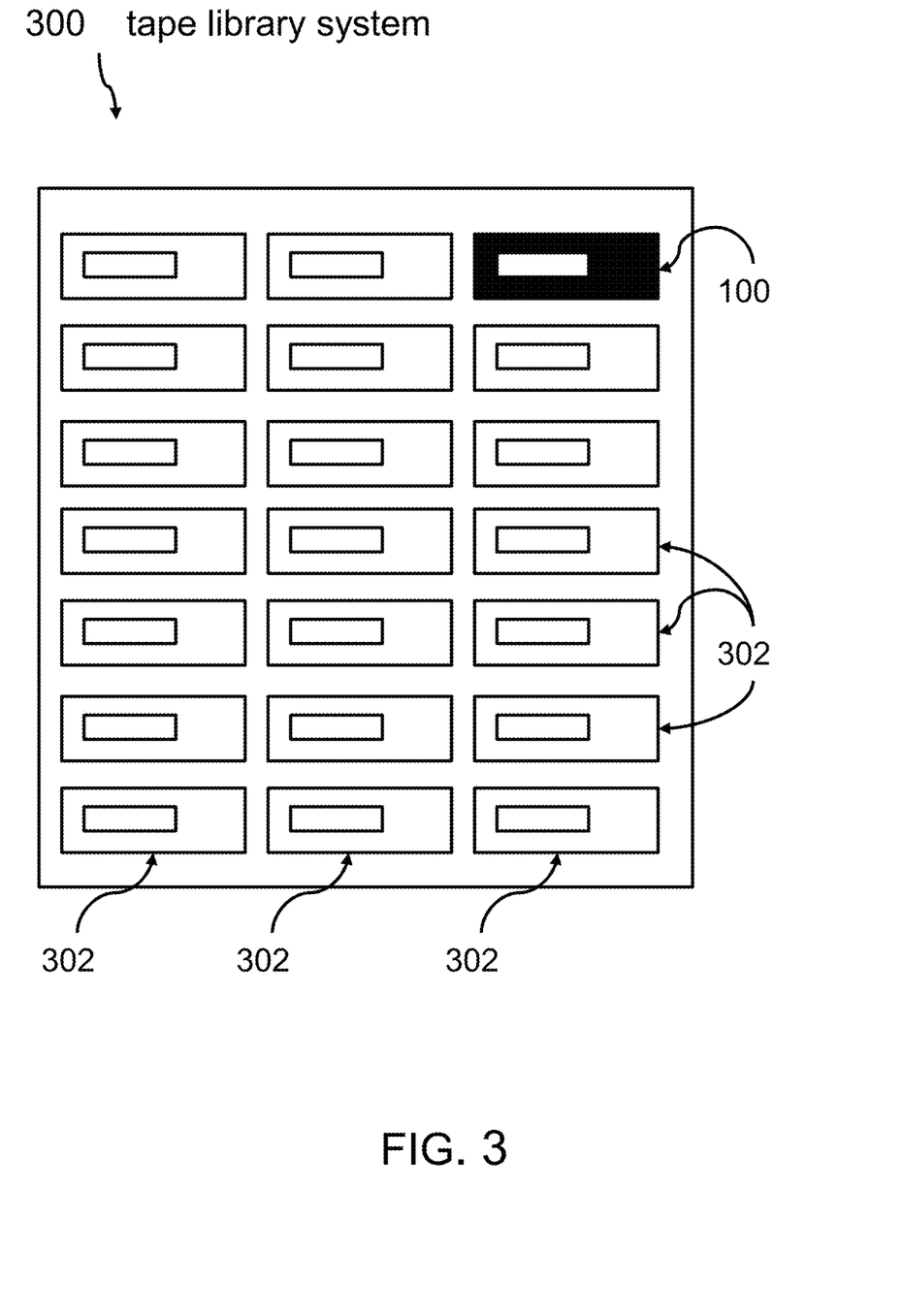
FIG. 3 shows a block diagram of a tape library system or multi tape library, in accordance with embodiments of the present invention.

FIG. 3 shows a block diagram of a tape library system 300 or multi tape library, in accordance with embodiments of the present invention. A plurality of normal tape drives 302 are installed to build a tape library 300. However, one of the tape drives 302 is replaced by a tape drive system 100 for ensuring tape data integrity by tape surface inspection. In case a tape error may be detected in any of the tape drives 302, the tape can be mounted to the tape drive system 100 and a surface inspection may be performed. If no tape error is present in any of the tape drives 302, the tape drive system 100 operates as any other tape drive 302.

The tape drive system 100 may also be installed temporarily on small installations to proactively prevent the tape library system 300 to get contaminated and can therefore be shared with multiple installations in a larger data center or among locations.

In another embodiment of the tape library system, all drives are tape drive systems with laser inspection units. Thus, all drives in the tape library system are able to detect any kind of tape problems and all tape drive systems will scan mounted tapes during their normal read/write process and will repost any kind of detected problems. The major benefit of this implementation alternative would be real-time tape problem detection. Furthermore, it is not required to mount a tape cartridge a second time in a tape drive system because a tape error was detected in a tape drive without any laser inspection unit.

FIG. 4 shows a block diagram of a method 400 for operating the tape library system 300, in accordance with embodiments of the present invention. Also here, the tape library system 300 comprises a plurality of tape drives 302. At least one tape drive system 100, for ensuring tape data integrity by tape surface inspection, replaces, 402, a regular tape drive. The tape drive system 100 comprises the laser inspection unit integrated into the tape drive system adapted for recognizing a tape defect when the tape drive system is in operation (i.e., performing regular read and/or write operation). The method also comprises, upon detecting an operational error of one of the plurality of tape drives 302 using a current magnetic tape, loading 404 the current magnetic tape into one of the at least one tape drive systems 100 and, scanning, 406, the magnetic tape during operation of the tape drive system with the laser inspection unit, as well as detecting a magnetic tape defect when the tape drive system is in operation.

Based on detecting a tape defect by the laser inspection unit any of the above-described activities may be initiated: loading, 408, a cleaning tape into the tape drive, the tape defect was initially detected on, perform, 410 a "call home", perform, 412, a dump of the content of the tape drive system, just to name a few.

With the known types of errors of a tape drive and the option to detect mechanical tape defects under operation, the following error matrix evolves:

TABLE 1

| No. | Perm write error | Perm. read error | Laser detection unit | C1/C2 correction threshold exceeded |
|---|---|---|---|---|
| 1 | X | — | — | — |
| 2 | — | X | — | — |
| 3 | — | — | X | — |
| 4 | — | — | — | X |
| 5 | X | — | X | — |
| 6 | — | X | X | — |
| 7 | — | — | X | X |

(Note:
perm = permanent)

As a consequence, several operation patterns may be followed depending on the left most number in the table:

No. 1 and 2 (Stop and Analyze):

The read/write operation will be aborted due to a permanent read or write error. Next, the tape will be repositioned to the permanent read or write error position, and the tape is inspected by the laser unit in slow mode (e.g. slow tape speed). The location will be calculated by the LPOS—logical position—of the permanent write error. An inspection will be done with low drive speed to get a better test result. The test results will be stored (e.g. stored in the drive dump). A tape alert signal will be sent to the host and a "call-home" initiated with detailed failure analysis data. The tape will be set to read-only and a tape drive cleaning will be performed.

No. 3 and 7 (Continue and Analyze):

In these situations, after the read/write operation, the drive will go into a recovery mode to verify the issue. The tape is repositioned to the laser inspection unit error position and the tape will be inspected by the laser unit in slow winding mode. Also here, the location will be calculated by the LPOS (i.e. logical position). The inspection will be done with low drive speed to get a better test result. The test results stored in the drive dump are saved and a drive dump is forced together with: (a) sending a tape alert to the host, (b) sending a "call-home" with detailed fault analysis data, (c) the read/write operation should now not be interrupted, and (d) a tape drive cleaning will be performed.

No. 5 and 6 (Stop and Analyze):

The read/write operation will be aborted due to a permanent read or write error. The tape will be rewound to the permanent read or write error position and the tape is inspected by the laser inspection unit in slow mode. Also here, the location will be calculated by the LPOS (i.e., the logical position) of the permanent write error. An inspection will be done with low drive speed to get a better test result. The test results stored in the drive dump will be saved. Then the tape is wound to the laser error position and the tape is inspected by the laser unit inspection in slow mode. Again, the location will be calculated by the LPOS (i.e., the logical position). The inspection will be done with low drive speed to get a better test result and the test results are saved (e.g. stored in the drive dump). A drive dump is forced, a tape alert to the host, a "call-home" with detailed fault analysis data will be sent, the tape will be set to read-only and a tape drive cleaning is performed.

No. 4 (Continue and Analyze):

After the read/write operation, the drive will go into a recovery mode to verify the issue. A drive dump will be forced, a tape alert is sent to the host system, a "call-home" is sent with detailed fault analysis data; the read/write operation should not be interrupted at this time and a tape drive cleaning is performed.

Thus, each of the different situations requires a slightly different system reaction in order to continue the normal operation without significant interrupts.

Figure 5:
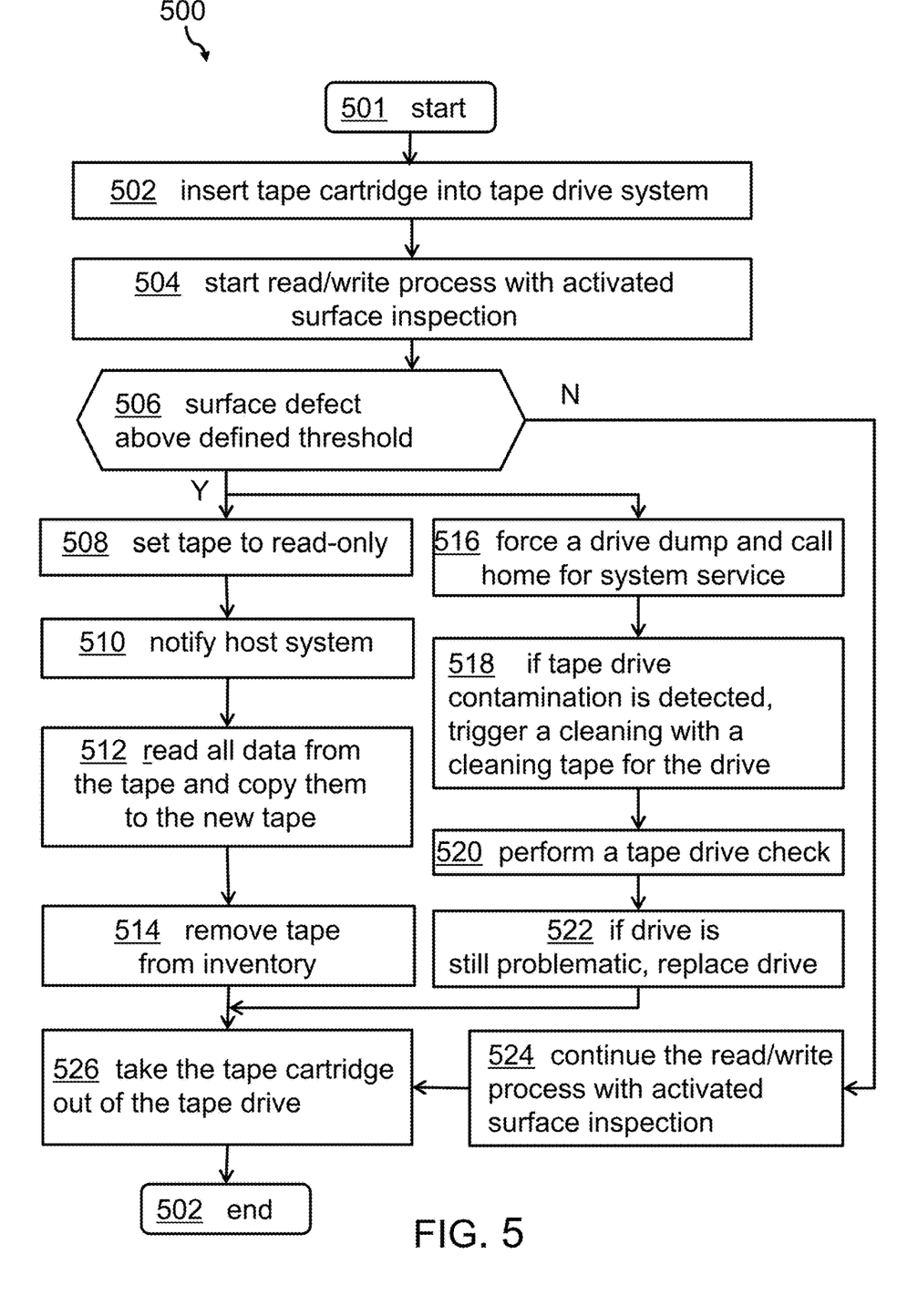
FIG. 5 shows a block diagram of a flowchart of a more comprehensive version of the method which is here adapted to a real-world operation, in accordance with embodiments of the present invention.

FIG. 5 shows a block diagram of a flowchart 500 of a more comprehensive version of the method 100 which is here adapted to a real-world operation, in accordance with embodiments of the present invention. The process starts at 501. Then, 502, the tape cartridge is inserted into the tape drive system. The read/write process with the activated surface inspection using the laser inspection unit is started, 504.

In a determination process step, 506, it will be determined if the surface defects are detected above the predefined threshold value(s). In case of "yes", a series of parallel action is started. 508: the tape is set to read-only; 510: the designated host system will be notified; 512: potentially, all data are read from the tape and they are copied to a new tape (e.g. in another tape drive); 514: also optionally, the damaged tape will be removed from the inventory; 516: a drive dump is forced and a call to system service is initiated; 518: if the tape drive system contamination is detected, a cleaning procedure with a cleaning tape for the drive is triggered; 520: a tape drive check is performed; 522: if there are still problems with the tape drive system, the tape drive system will be replaced.

From here, the tape cartridge will be taken out, 526, of the tape drive system. The same step 526 will be performed in case of "no" at the determination 506 (e.g. surface defects detected above predefined threshold) and after a continuation 524 of the read/write process with activated surface inspection.

Embodiments of the invention may be implemented together with virtually any type of computer, regardless of the platform being suitable for storing and/or executing program code.

Figure 6:
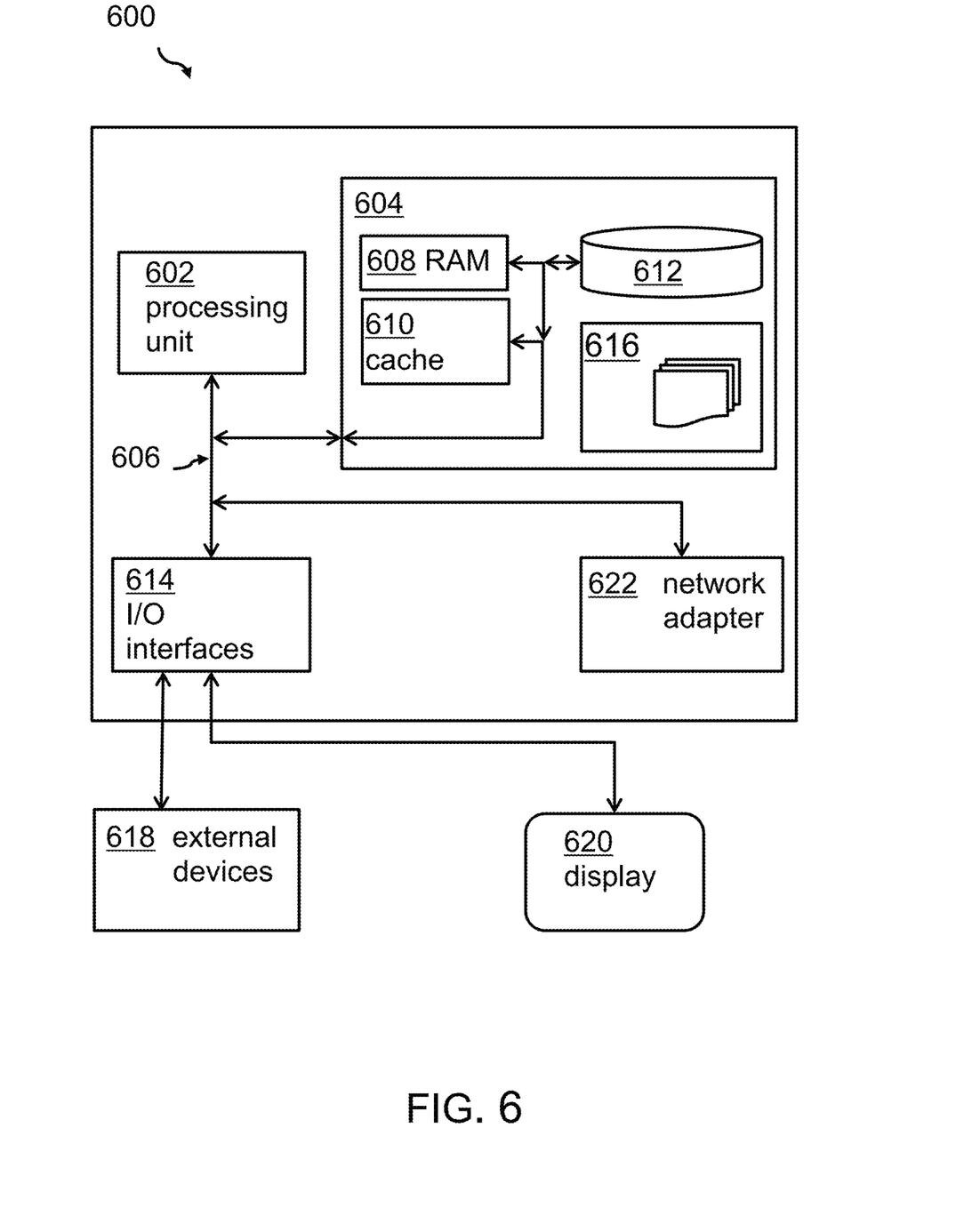
FIG. 6 shows an embodiment of a computing system instrumental for executing the here proposed methods and systems, in accordance with embodiments of the present invention.

FIG. 6 shows, as an example, a computing system 600 suitable for executing program code related to the proposed method, in accordance with embodiments of the present invention.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

What is claimed is:

1. A tape drive system comprising:
   a laser light source configured for recognizing a tape defect by sending out light pulses towards a magnetic tape when the tape drive system is in operation;
   a read/write head configured for acting together with the laser light source as sensors for providing sensor data during a read/write operation of the tape drive system; and
   a controller configured for evaluating the sensor data and for triggering predefined actions based on evaluation results.

2. The tape drive system according to claim 1, wherein the laser light source comprises a sender and a receiver integrated into the tape drive system, the laser light source being positioned adjacent to the read/write head of the tape drive system.

3. The tape drive system according to claim 1, wherein the laser light source is configured for generating, as part of the sensor data, a time difference information between a point in time of sending a laser pulse from the laser light source and receiving back the laser pulse reflected by the magnetic tape positioned in the tape drive system.

4. The tape drive system according to claim 1, wherein the controller is configured for relating the tape defect to an error condition of which at least one error condition is selected from the group consisting of: a permanent write error, a permanent read error, and a tape bad spot correction threshold exceedance.

5. The tape drive system according to claim 1, wherein the tape defect is at least one defect is selected from the group consisting of: a tape contamination, a scratch on the magnetic tape or, a fold of the magnetic tape.

6. A tape library system comprising:
   a plurality of tape drives and at least one tape drive system according to claim 1.

7. The tape library system according to claim 6, wherein the laser light source is positioned adjacent to the read/write head of the tape drive system.

8. The tape library system according to claim 6, wherein the laser light source is configured for generating, as part of the sensor data, a time difference information between a point in time of sending a laser pulse from the laser light source and receiving back the laser pulse reflected by the magnetic tape positioned in the tape drive system.

9. The tape library system according to claim 6, wherein the controller is configured for relating the tape defect with an error condition of which at least one error condition is selected from the group consisting of: a permanent write error, a permanent read error, and a bad spot correction threshold exceedance.

10. The tape library system according to claim 6, wherein the tape defect is at least one tape defect selected from the group consisting of: a tape contamination, a scratch on the magnetic tape, and a fold of said magnetic tape.

11. A method for ensuring tape data integrity by tape surface inspection when using a tape drive system being configured for reading and writing data from or to a magnetic tape, the method comprising:
    providing a laser light source configured for sending out light pulses towards a magnetic tape when the tape drive system is in operation;
    recognizing, by the laser inspection unit, a tape defect as a function of the light pulses sent towards the magnetic tape when the tape drive system is in operation, wherein a read/write head acts together with the laser light source as sensors for providing a sensor data during a read/write operation of the tape drive system;
    evaluating, by the controller, the sensor data; and
    triggering, based on the evaluating, predefined actions based on the evaluating.

12. The method according to claim 11, further comprising:
    winding, upon detecting the tape defect, the magnetic tape to a detected tape defect location and repeating a scanning the magnetic tape with the laser light source using a reduced winding speed of the magnetic tape compared to a winding speed of an initial detection of the tape defect under a normal operation mode.

13. The method according to claim 12, further comprising:
 performing a tape drive dump, upon also detecting a tape defect under the reduced winding speed.

14. The method according to claim 11, further comprising:
 generating a signal indicative of a need for manual inspection to a remote console.

15. The method according to claim 11, further comprising:
 upon detecting a tape drive contamination:
 performing a loading of a cleaning tape into the tape drive system; and
 performing a cleansing of the tape drive using the cleaning tape.

16. A method for operating a tape library system, the tape library system comprising a plurality of tape drives and at least one tape drive system for ensuring tape data integrity by tape surface inspection, the tape drive system being configured for reading and writing data from or to a magnetic tape, the tape drive system comprising:
 a laser light source configured for recognizing a tape defect by sending out light pulses towards a magnetic tape when the tape drive system is in operation;
 a read/write head configured for acting together with the laser light source as sensors for providing sensor data during a read/write operation of the tape drive system; and
 a controller configured for evaluating the sensor data and for triggering predefined actions based on evaluation results.

17. The method of claim 16, further comprising:
 upon detecting an operational error of one of the plurality of tape drives using a current magnetic tape:
 loading the current magnetic tape into one of the at least one tape drive systems;
 scanning the magnetic tape during operation of the tape drive system with the laser light source; and
 detecting a magnetic tape defect when the tape drive system is in operation.

18. A computer program product, comprising a computer readable hardware storage device storing a computer readable program code, the computer readable program code comprising an algorithm that when executed by a computer processor of a computing system implements a method of claim 16.

* * * * *